United States Patent
Xia et al.

(10) Patent No.: US 6,556,689 B1
(45) Date of Patent: Apr. 29, 2003

(54) WATERMARKING METHODS FOR DIGITAL IMAGES AND VIDEOS

(75) Inventors: Xiang-Gen Xia, Newark, DE (US); Charles Boncelet, Jr., Newark, DE (US); Gonzalo R. Arce, Wilmington, DE (US)

(73) Assignee: University of Delaware, Newark, DE (US)

( * ) Notice: Subject to any disclaimer, the term of this patent is extended or adjusted under 35 U.S.C. 154(b) by 0 days.

(21) Appl. No.: 09/295,426

(22) Filed: Apr. 20, 1999

Related U.S. Application Data

(60) Provisional application No. 60/087,139, filed on May 29, 1998.

(51) Int. Cl.[7] .................................................. G06K 9/00
(52) U.S. Cl. ........................ 382/100; 713/176; 382/240
(58) Field of Search ................................ 382/100, 232; 713/176, 179; 380/210, 287, 252, 54

(56) References Cited

U.S. PATENT DOCUMENTS

| | | | | |
|---|---|---|---|---|
| 5,822,456 A | * | 10/1998 | Reed et al. | 382/232 |
| 5,862,260 A | * | 1/1999 | Rhoad | 382/232 |
| 5,867,602 A | * | 2/1999 | Zandi et al. | 382/248 |
| 6,226,387 B1 | * | 5/2001 | Tewfil et al. | 382/100 |
| 6,332,030 B1 | * | 12/2001 | Manjunath et al. | 382/100 |

OTHER PUBLICATIONS

Shapiro, J., *Embedded Image Coding Using Zerotrees of Wavelet Coefficients* (Dec. 1993).

* cited by examiner

*Primary Examiner*—Bhavesh Mehta
*Assistant Examiner*—Abolfazl Tabatabai
(74) *Attorney, Agent, or Firm*—Connolly Bove Lodge & Hutz LLP

(57) ABSTRACT

The present invention relates to multiresolution watermarking methods for digital images which are based on a discrete wavelet transform (DWT). Pseudo-random codes are added to the large coefficients located at the high and middle frequency bands of the DWT of a digital image. A peak is detected to signify a signature of the watermark. The methods taught herein are more robust then conventional methods for common image distortions, such as the wavelet transform based image compression, additive noise, image halftoning, and image rescaling. Moreover, the method is hierarchal. The computational load needed to detect the watermark depends on the noise level in an image. The multiresolution and hierarchial watermarking method taught by the present invention results in lower computational loads, on average, while providing a high quality watermark which is utilizable with modern image/video compression standards.

8 Claims, 8 Drawing Sheets

WATERMARKING METHODS FOR DIGITAL IMAGES AND VIDEOS

This application claims the benefit of Provisional application Ser. No. 60/087,189, filed May 29, 1998.

BACKGROUND OF THE INVENTION

1. Field of the Invention

The present invention relates to watermarking methods for digital images and videos. More particularly, this invention relates to watermarking methods in the wavelet transform domain.

2. Description of the Prior Art

With the rapid development of information technology, electronic publishing, such as the distribution of digitized images/videos, is becoming more popular. One of the more important issues for the electronic publisher is the ability to obtain and enforce copyright protection. Watermarking is one of the common copyright protection methods that has recently received considerable attention. Watermarking for digital images basically consists of signing an image with a signature or copyright message such that the message is secretly embedded in the image and there is no visible difference between the original and the signed images.

There are two common methods of watermarking: frequency domain and spatial domain watermarks. The present invention focuses on the frequency domain watermarks. Conventional frequency domain watermarking methods are based on the discrete cosine transform (hereinafter "DCT"), where pseudo-random sequences, such as M-sequences, are added to the DCT coefficients at the middle frequencies as signatures. This approach, of course, matches the current image/video compression standards well, such as JPEG, MPEG1-2, and the like.

Moreover, it is known that wavelet image/video coding, such as embedded zero-tree wavelet (hereinafter "EZW") coding, has potential to be included in future image/video compression standards, such as JPEG2000 and MPEG4, due to its excellent performance in compression. The basics of EZW can be found in J. Shapiro, "Embedded image coding using zerotrees of wavelet coefficients", *IEE Trans. On Signal Processing*, Vol. 41, pages 3445–3462, December, 1993, which is hereby incorporated in its entirety by reference. The basic idea of EZW is to keep large coefficients with a quantization and throw away small coefficients in the DWT transform domain with a tree-structured addressing. The tree-structured addressing is due to the DWT pyramid decomposition as shown in FIG. 3. Consequently, it is important to study watermarking methods in the wavelet transform domain.

Discrete wavelet transform (hereinafter "DWT") has been extensively studied in the last decade. There are numerous applications of wavelet transforms such as compression, detection, and communications. Basically, in the DWT for a one dimensional signal, a signal is split into two parts, one having high frequencies and one having low frequencies. The part with the high frequencies basically contains the edge components of the signal, while the part with the low frequencies basically contains the smooth areas of the signal. The part with low frequencies is split again into two parts of high and low frequencies. This process is continued an arbitrary number of times, which is usually determined by the application at hand. Furthermore, from these DWT coefficients, the original signal can be reconstructed. This process is called the inverse DWT (hereinafter "IDWT").

The DWT and IDWT can be mathematically stated as follows:

Let $H(w)=\Sigma hke^{-jkw}$, and $G(w)=\Sigma gke^{-jkw}$, represent a low-pass filter and a highpass filter, respectively, which will satisfy certain conditions for reconstruction to be stated later. A signal $x[n]$ can be decomposed recursively as shown in equations (1) and (2):

$$c_{j-1,k} = \sum_n h_{n-2k} c_{j,n} \tag{1}$$

$$d_{j-1,k} = \sum_n g_{n-2k} c_{j,n} \tag{2}$$

for $j=J+1, J, \ldots, J_0$ where $c_j+_{l+k}=x[k]$, $k \in Z$, $J+1$ is the high resolution level index and $J_0$ is the low resolution level index. The coefficients $c_{J_0,k}, d_{J_0,k}, d_{J_0+1,k}, \ldots, d_{J,k}$ are called the DWT of signal $x[n]$ where $c_{J_0,k}$ is the lowest resolution part of $x[n]$ and $d_{j,f}$ are the details of $x[n]$ at various bands of frequencies. Furthermore, the signal $x[n]$ can be reconstructed from its DWT coefficients recursively as shown in equation (3):

$$c_{j,n} = \sum_k h_{n-2k} c_{j-1,k} + \sum_k g_{n-2k} d_{j-1,k}. \tag{3}$$

The above reconstruction is called the IDWT of $x[n]$. To ensure the above relationship between IDWT and DWT, the following orthogonal condition on the filters $H(w)$ and $G(w)$ is needed:

$$|H(w)|^2+|G(w)|^2=1.$$

Examples of $H(w)$ and $G(w)$ are given by:

$$H(\omega) = \frac{1}{2} + \frac{1}{2}e^{-j\omega}, \text{ and } G(\omega) = \frac{1}{2} - \frac{1}{2}e^{-j\omega},$$

and are known as the Haar wavelet filters.

The above DWT and IDWT for a one dimensional signal $x[n]$ can be also described via two channel tree structured filterbanks as can be seen in FIG. 1.

The DWT and IDWT for two dimensional images $x[m, n]$ can be similarly defined by implementing the one dimensional DWT and IDWT for each dimension m and n separately: $DWT_n[DWT_m[x[m,n]]]$, as can be seen in FIG. 2.

An image can be decomposed into a pyramid structure, as shown in FIG. 3, and provide various band information, for instance, the low-low, low-high, and-high-high frequency bands. An example of this kind of decomposition with two levels is shown in FIG. 4, where the edges appear in all bands, except in the lowest frequency band, i.e., the corner part at the left and top.

Conventional watermarking methods have several limitations upon which the present invention seeks to improve. For instance, current watermarking methods for digital images and videos, such as the discrete cosine transform (hereinafter "DCT") based approach, are not very robust, do not have multiresolution characteristics, and are not hierarchical in structure, which results in, among other things, high computer loads for distorted images. The present invention solves these problems.

It is, therefore, an object of the present invention to develop a watermarking method for digital images and videos which is based on DWT, and overcomes the limitations of conventional watermarking methods.

It is a further object of the present invention to develop a DWT based watermark which is more robust than conventional methods for common image distortions.

It is yet further another object of the present invention to develop a DWT based watermark which has multiresolution characteristics.

It is also an object of the present invention to develop a DWT based watermark which is hierarchical and provides reduced computational loads.

These and other objects of the present invention can be better appreciated by referring to the following description and claims taken in conjunction with the accompanying drawings.

SUMMARY OF THE INVENTION

The present invention relates to a method of multiresolution watermarking for digital images, which utilizes wavelet transform based watermarking techniques by adding pseudo-random codes (or sequences) to large coefficients located at the high and middle frequency bands of the DWT of the digital image. A peak is then detected to signify a signature of the watermark.

There are three principal advantages with this approach. First, the watermarking method has multiresolution characteristics and is hierarchical. In the case when a received image is not distorted significantly, the cross correlations with the whole size of the image may not be necessary, and therefore, much of the computational load can be saved. Second, the human eyes are generally insensitive to small changes in the edges and textures of an image, but are very sensitive to small changes in the smooth parts of an image. With the DWT, the edges and textures are usually exploited very well in high frequency subands, such as HH, LH, HL, and the like. The large coefficients in these bands usually indicate edges in an image. Therefore, adding watermarks on these large coefficients would be difficult for the human eyes to perceive. Finally, the third advantage is that this approach matches the emerging image/video compression standards. Numerical results show that the watermarking method of the present invention is very robust to wavelet transform based image compressions, such as the EZW image compression scheme, as well as to other common image distortions, such as additive noise, halftoning, and rescaling.

DESCRIPTION OF THE PREFERRED EMBODIMENTS

Figure 1:
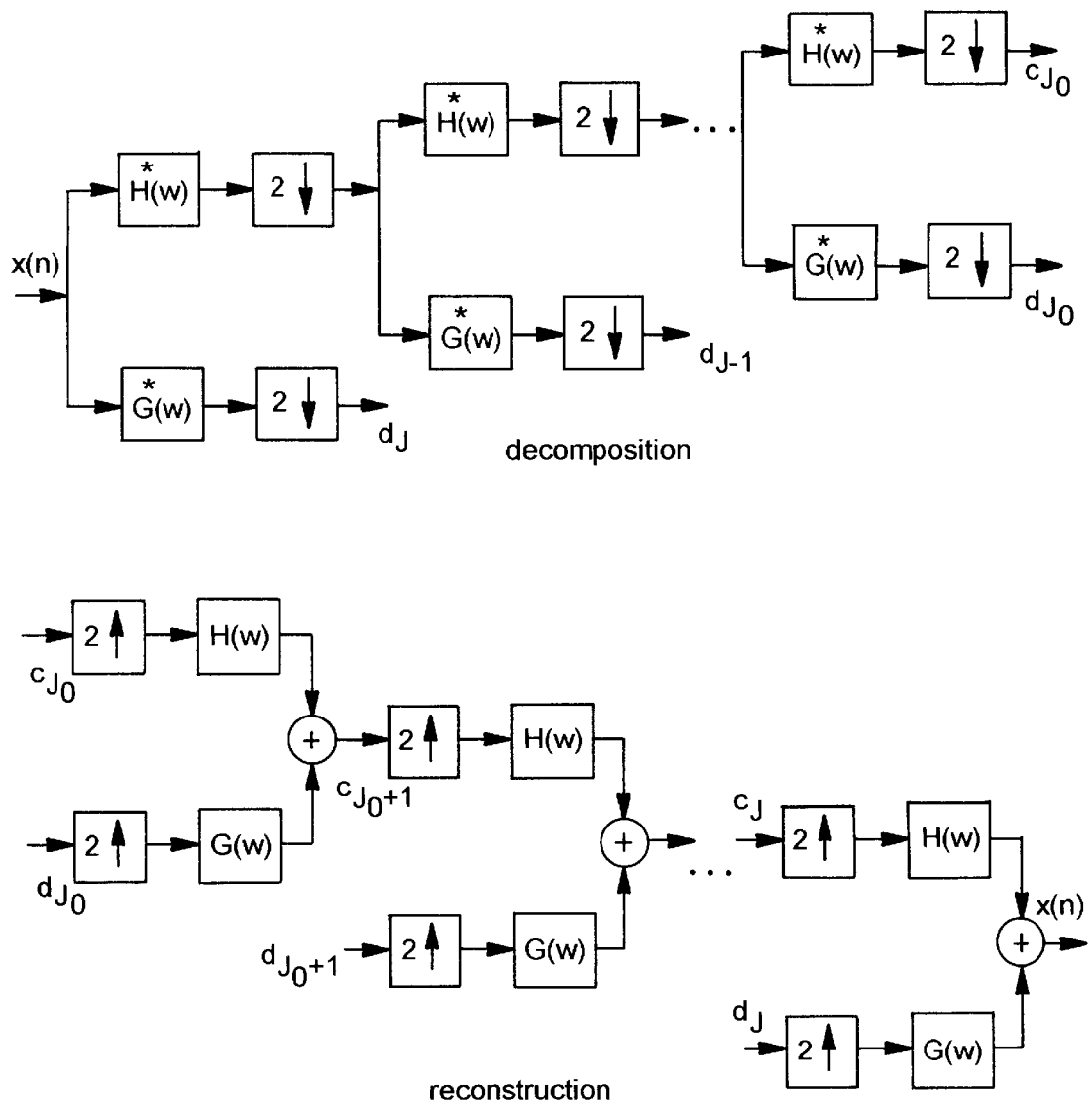
FIG. 1 depicts a prior art flowchart of the DWT for one dimensional signals.
Figure 2:
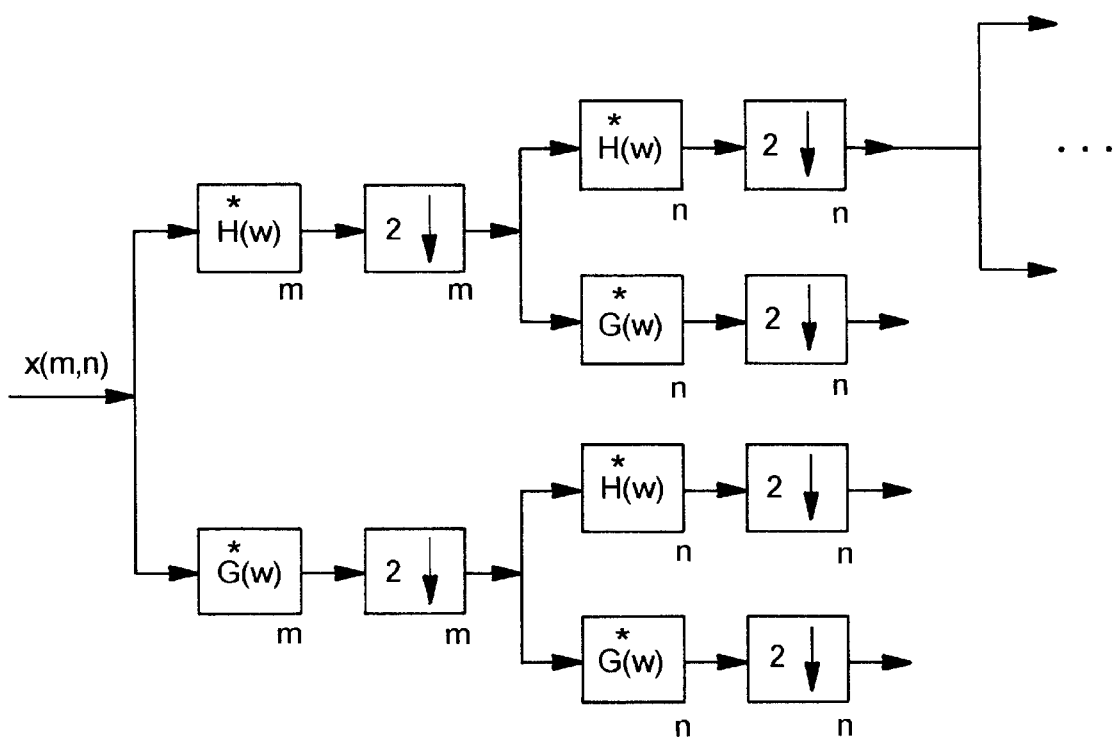
FIG. 2 depicts a prior art flowchart of the DWT for two dimensional signals.
Figure 3:
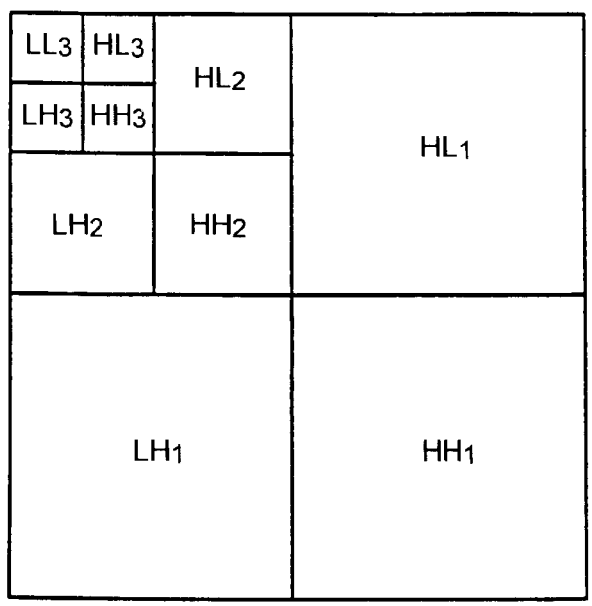
FIG. 3 depicts a prior art DWT pyramid decomposition of an image.
Figure 4:
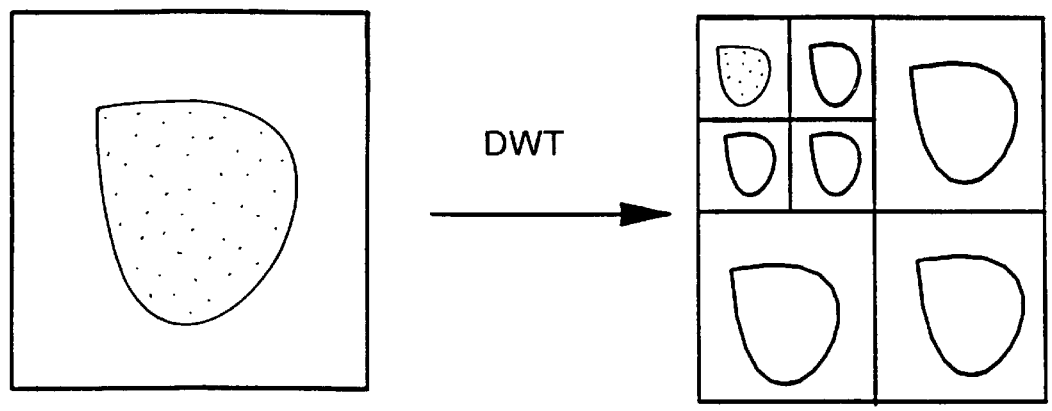
FIG. 4 depicts another prior art DWT pyramid decomposition of an image which shows only two band levels.

Watermarking in the DWT domain includes two parts: encoding and decoding. In the encoding part, an image is first decomposed into several bands with a pyramid structure as shown in FIGS. 3 and 4, and then pseudo-random sequences (e.g., Gaussian noise) are added to large coefficients located at high and middle frequency bands of the DWT, that is, to the large coefficients which are not located at the lowest resolution, for example, at the top left hand corner. Mathematical analysis of the encoding part lets y[m,n] denote the DWT coefficients which are not located at the lowest frequency band of an image x[n,m]. A Gaussian noise N[m,n] is added with a mean of 0 and a variance of 1 to y[m,n]. The resulting mathematical expression is equation (4):

$$\bar{y}[m,n] = y[m,n] + \alpha(y[m,n])^2 \cdot N[m,n],$$

where is a parameter to control the level of the watermark and the squared y[m,n] indicates the amplification of the large DWT coefficients. The DWT coefficients at the lowest resolution are unchanged. Then, take the two dimensional IDWT of the modified DWT coefficients $\bar{y}$ and the unchanged DWT coefficients at the lowest resolution and let $\bar{I}[m,n]$ denote the IDWT coefficients. For the resultant image to fit within the 0 to 255 integer values, which is typical image data, it is modified as shown in equation (5):

$$\hat{x}[m,n] = \left[ 255 \frac{\tilde{x}[m,n] - \min_{m,n}(\tilde{x}[m,n])}{\max_{m,n}(\tilde{x}[m,n]) - \min_{m,n}(\tilde{x}[m,n]))} \right].$$

Figure 5A:
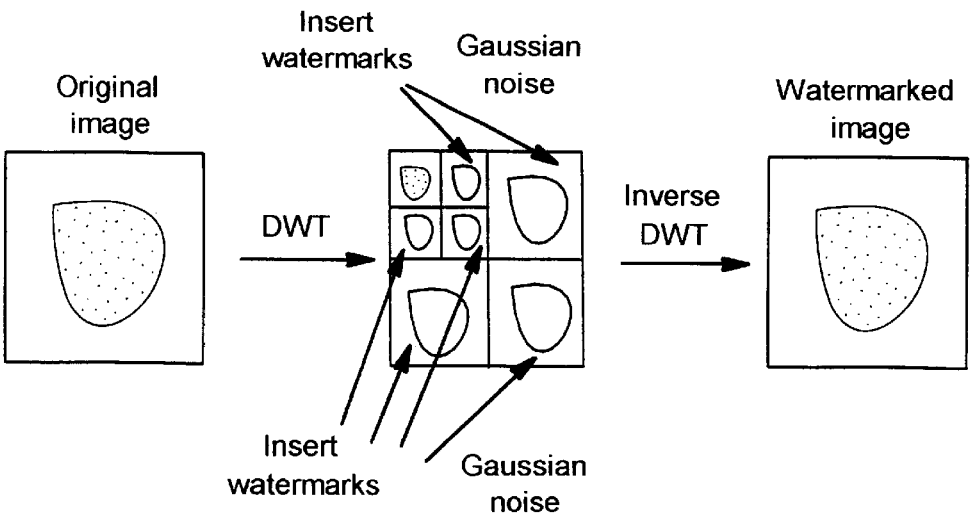
FIGS. 5a and 5b illustrate the encoding and decoding parts, respectively, of the inventive watermarking process in the DWT domain.

The operation of equation (5) converts the two dimensional data $\bar{I}[m,n]$ into an 8-bit level image. The resultant image $\bar{I}[m,n]$ is the watermarked image of x[m,n]. The encoding part of the present invention is illustrated in FIG. 5(a).

Figure 5B:
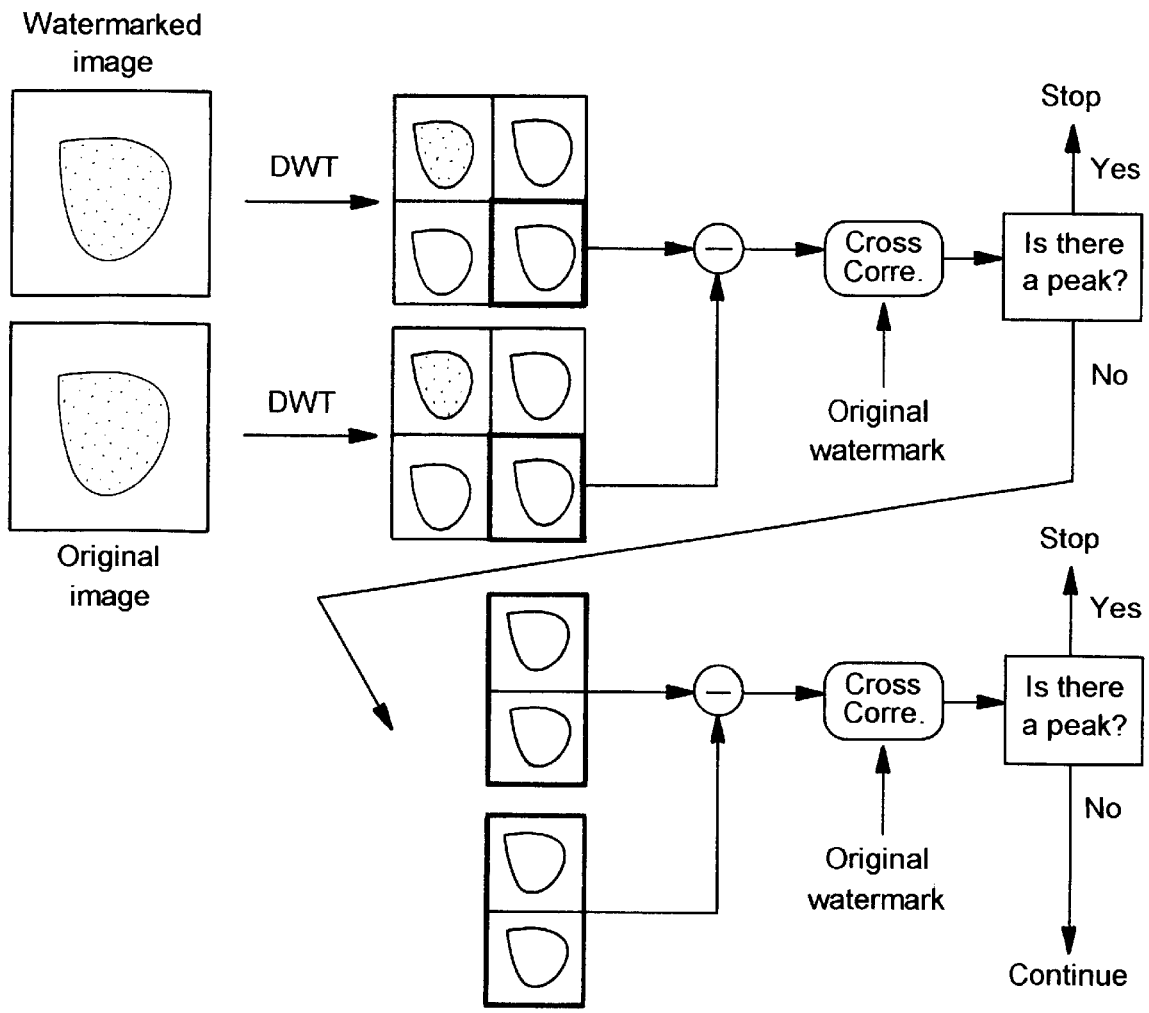

The decoding part of the present invention is hierarchical and described as follows. First, a received image and the original image (it is assumed that the original image is known) is decomposed with DWT into four bands, for instance, low-low ($LL_1$) band, low-high ($LH_1$) band, high-low ($HL_1$) band, and high-high ($HH_1$) band, respectively. Then, the signature added in the $HH_1$ band and the difference of the DWT coefficients in the $HH_1$ bands of the received and original images are compared by calculating their cross correlations. If there is a peak in the cross correlations, the signature is determined to be detected. Otherwise, the signature added in the $HH_1$ and $LH_1$ bands is compared with the difference of the DWT coefficients in the $HH_1$ and $LH_1$ bands, respectively. If there is a peak, the signature is detected. Otherwise, one considers the signature added in the $HL_1$, $LH_1$, and $HH_1$ bands. If there is still no peak in the cross correlations, one continues to decompose the original and the received signals in the $LL_1$ band into four additional subbands, $LL_2$, $LH_2$, $HL_2$, and $HH_2$, and so on until a peak appears in the cross correlations. If numerous attempts (e.g., 6 times) to split the signals into subbands fails to produce a peak, then the signature is determined to be undetectable. The decoding part of the present invention is illustrated in FIG. 5(b).

The following example will further illustrate the present invention:

EXAMPLE 1

Consider the image of peppers with a size of 512×512. Two watermarking methods are implemented: one using the DCT approach and the other using the DWT approach taught by the present invention. The DWT approach advantageously includes the Haar DWT wavelet filters. A two step DWT is implemented and images are decomposed into seven (7) subbands. Watermarks (e.g., Gaussian noise) are added to six (6) subbands, but not to the seventh or lowest subband (the lowest frequency components). In the DCT approach, watermarks (e.g., Gaussian noise) are added to the DCT coefficients at the same positions as the ones in the above DWT approach. The levels of watermarks in the DWT and DCT approaches are the same.

Figure 6A:
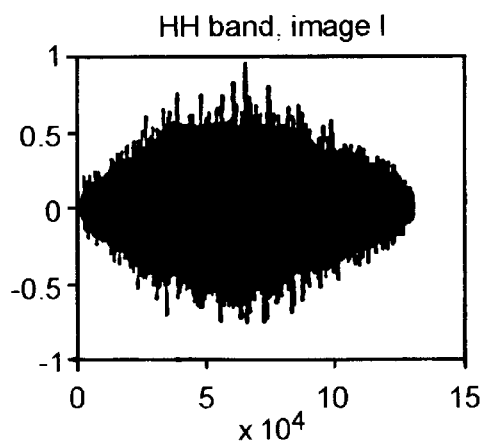
FIGS. 6a, 6b, 6c, and 6d show cross correlations for watermark detections with low and high additive noises.
Figure 6B:
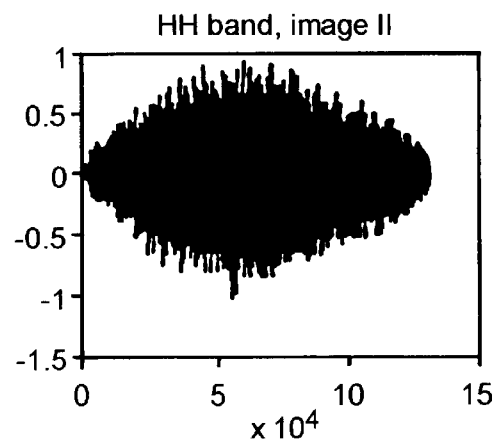
Figure 6C:
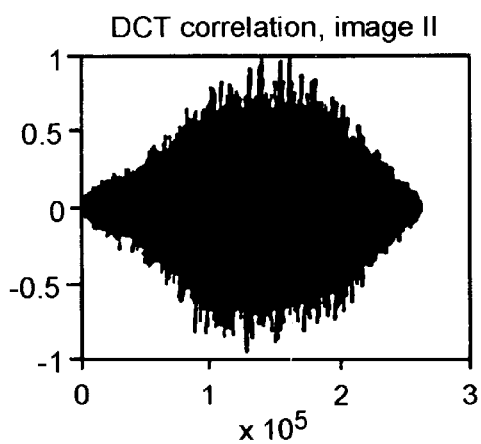
Figure 6D:
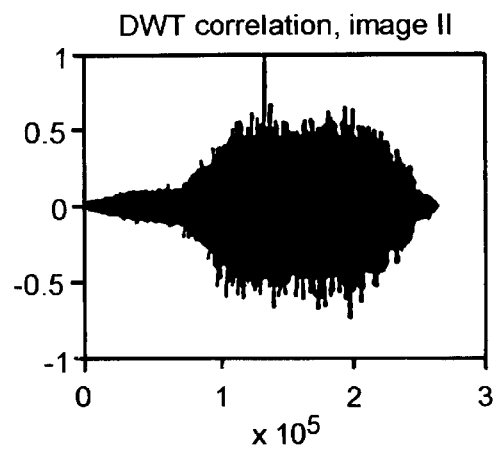

The digital image is pyramidally decomposed and distorted. Four distortions are tested to identify and describe the watermarked image. The first distortion to test with the present invention's algorithm is additive noise. When the variance of the additive noise is not too large, the signature can be detected only by using the information in the $HH_1$ band with the DWT approach. FIG. 6(a) shows the cross correlations for watermark detection for the DWT method with $HH_1$ band and low additive noise; a peak can be clearly seen. In contrast, when the variance of the additive noise is large, the $HH_1$ band information is not good enough with the DWT approach. FIG. 6(b) shows the cross correlations for watermark detection for the DWT method with $HH_1$ band and high additive noise; no clear peak can be seen. However, the signature can still be detected by using the information in the $HH_1$ and $LH_1$ bands with the DWT approach. FIG. 6(d) shows the cross correlations for watermark detection for the DWT method with $HH_1$ and $LH_1$ bands and high additive noise; a peak can be clearly seen. Finally, the DCT approach was also implemented for the image with high additive noise. In this case, the signature with the DCT approach cannot be detected. FIG. 6(c) shows the cross correlations for watermark, detection for the DCT method for high additive noise; no peak can be clearly seen.

Figure 7A:
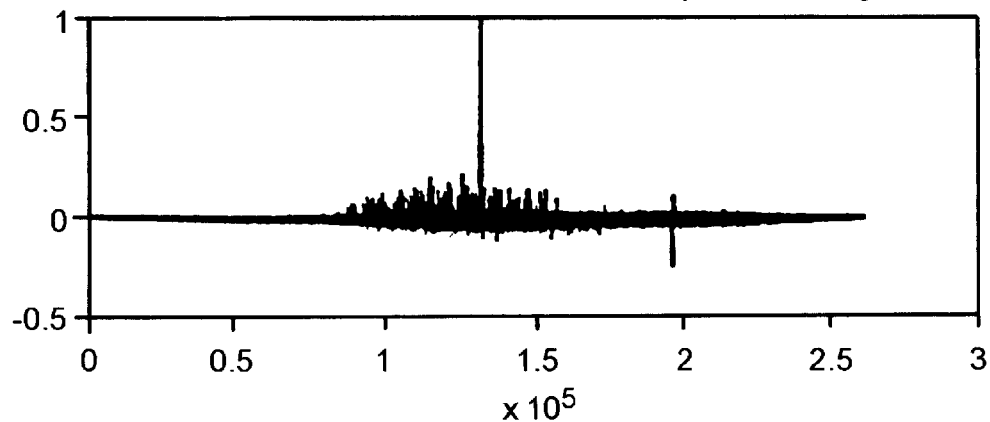
FIGS. 7a and 7b show cross correlations for watermark detections with compressed images.
Figure 7B:
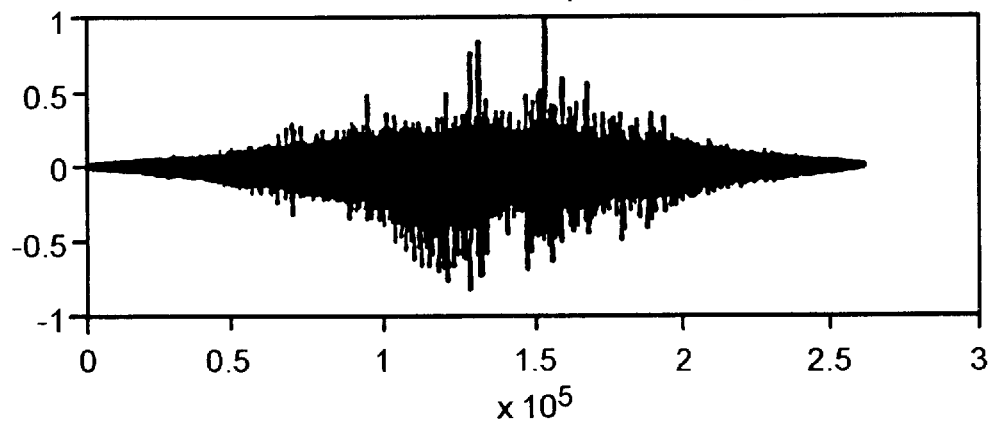

The second distortion to test is image compression. The two watermarked images with the DWT and DCT approaches are compressed by using the EZW coding algorithm scheme discussed in the Shapiro reference, supra. It is advantageous to include EZW wavelet coding in the present invention. The compression ratio is chosen as 64, for example, 0.125 bpp. The cross correlations for watermark detection for these two compressed images are shown in FIGS. 7(a) and 7(b), where FIG. 7(a) corresponds to the DWT approach and FIG. 7(b) corresponds to the DCT approach. A peak in the center of the drawing can be clearly seen in FIG. 7(a) with the DWT approach, but no clear peaks can be seen in FIG. 7(b) with the DCT approach.

The third distortion to test is the halftoning. The two watermarked images are both halftoned by rising the following standard method. Let x[m,n] be an image with 8-bit levels. To halftone it, execute nonuniform thresholding through the Bayer's dither matrix T:

$$T_P(T_{j,k})_{4n-1} = 14 \begin{pmatrix} 11 & 7 & 10 & 6 \\ 3 & 15 & 2 & 14 \\ 9 & 5 & 12 & 4 \\ 1 & 13 & 4 & 14 \end{pmatrix}$$

Figure 8A:
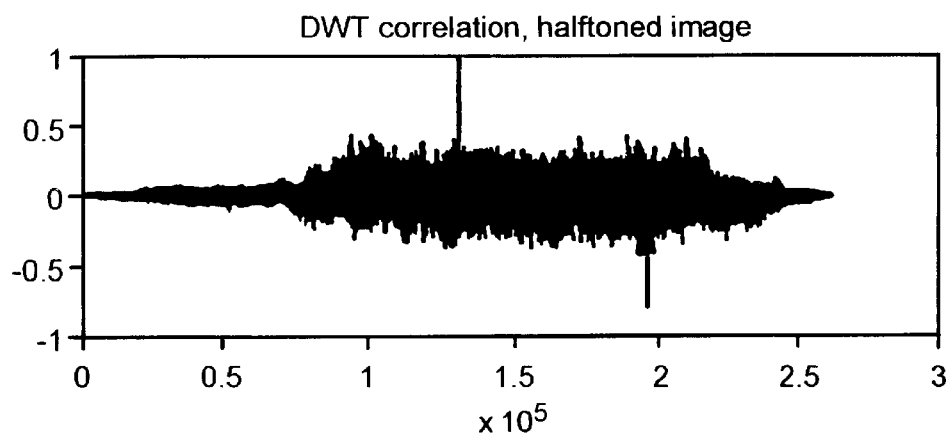
FIGS. 8a and 8b show cross correlations for watermark detections with half toned images.
Figure 8B:
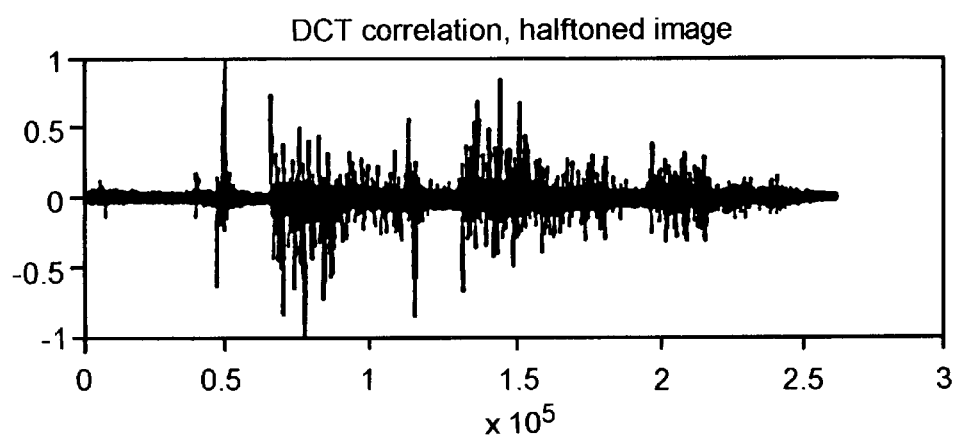

Compare each disjointed 4×4 block in the image of x[m,n]. If $x[m*4+j,n*4+k] \geq T_{j,k}$, then it is quantized to 1. Otherwise, it is quantized to 0. Both DWT and DCT watermarking methods were tested. Surprisingly, it was found that the watermarking method based on DWT as proposed by the present invention is more robust than the method based on DCT. The cross correlations for watermark detection for halftoned images are shown in FIGS. 8(a) and 8(b), where FIG. 8(a) corresponds to the DWT approach, while FIG. 8(b) corresponds to the DCT approach. One can clearly see a peak in the center of FIG. 8(a), while no clear peak can be seen in the middle of FIG. 8(b).

Figure 9A:
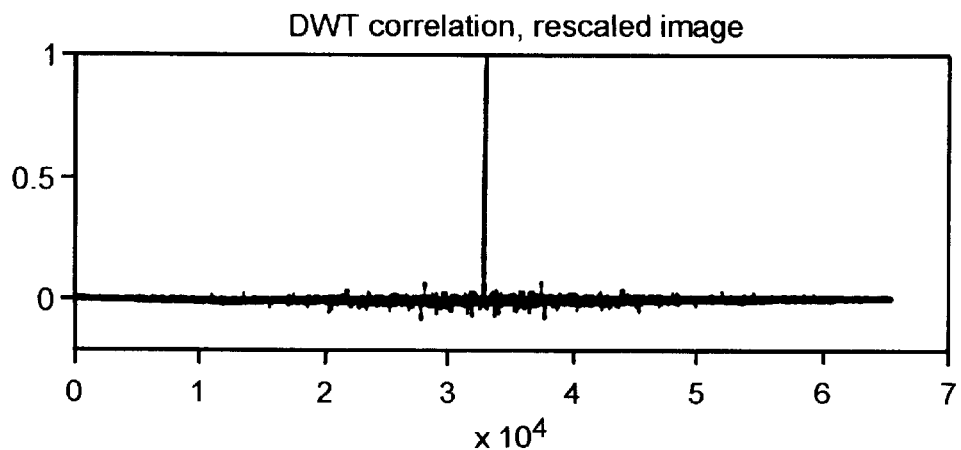
FIGS. 9a and 9b show cross-correlations for watermark detections with rescaled images.
Figure 9B:
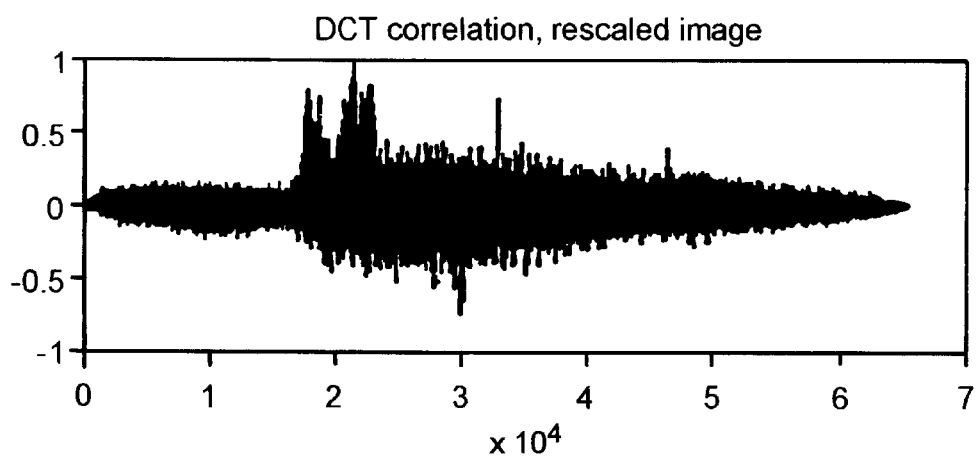

The last distortion to test is image scaling. The resolutions of the watermarked images are reduced by averaging four neighboring samples together and then down sampling them by 2 at each dimension. With this kind of distortion, the watermark method using DWT is more robust than the watermarking method using DCT. The cross correlations for watermark detection for rescaled images are shown in FIGS. 9(a) and 9(b), the former figure representing the DWT approach and the latter figure representing the DCT approach. One can clearly see the peak in the center of FIG. 9(a) for the DWT approach, but no peak can be seen in the center of FIG. 9(b) for the DCT approach.

The present invention has introduced new and improved multiresolution watermarking methods using a discrete wavelet transform (DWT). The watermarking method taught herein adds Gaussian random noise to the large coefficients in the DWT domain. The decoding is hierarchical. If distortion of a watermarked image is not serious, then only a few bands of information will be sufficient to detect the signature, which would result in a reduction of the required computational load. The examples illustrated herein show several kinds of distortions, such as additive noise, compressed imaging (with the wavelet approach, such as EZW), halftoning, rescaled imaging, and reduced resolution, all of which are applicable to the present invention. It has been found that the DWT based watermark approach of the present invention is robust to all of the above distortions, while the DCT approach is not very robust. In particular, the DCT approach is not robust with respect to the distortions of compression, additive noise with large noise variance, and resolution reduction.

Although the invention has been described with a certain degree of particularity, it is understood that the present invention has been made only by way of example and that numerous changes in the details of construction and the combination and arrangement of parts may be resorted to without departing from the spirit and scope of the invention.

What is claimed is:

1. A method of multiresolution watermarking for digital images, the method comprising the steps of: a) adding pseudo-random sequences to large coefficients positioned at high and middle frequency bands of a discrete wavelet transform of the digital image; b) taking the inverse discrete wavelet transform of the discrete wavelet transform of the digital image having added pseudo-random sequences to produce a watermarked image; and c) detecting a peak to signify a signature of the watermarked image.

2. A method of multiresolution watermarking for digital images, the method comprising the steps of encoding and decoding the digital image in a discrete wavelet transform, wherein the encoding steps comprise:
 a) decomposing the digital image into a multiplicity of bands having a pyramidal structure;
 b) adding pseudo-random sequences to large coefficients located at high and middle frequency bands of the discrete wavelet transform; and
 c) taking the inverse discrete wavelet transform of the discrete wavelet transform having added pseudo-random sequences to produce a watermarked image;

and wherein the decoding steps comprise:
 d) decomposing the watermarked image and the original digital image into at least four bands; and
 e) calculating cross correlations of the bands of the watermarked and original digital images until a peak is detected; or if no peak is detected,
 f) decomposing the watermarked and original digital images into four additional subbands and repeating step e) until a peak is detected, wherein the detection of the peak signifies a signature of the watermarked image and the failure to detect the peak signifies an undetectable signature of the watermarked image.

3. The method according to claim 2, wherein the decoding steps are hierarchical.

4. The method according to claim 2, wherein the four bands in step d) comprise a low-low band, a low-high band, a high-low band, and a high-high band.

5. The method according to claim 2, wherein the discrete wavelet transform includes Haar wavelet filters.

6. The method according to claim 2, wherein the watermarking includes embedded zero-tree wavelet coding.

7. The method according to claim 2, wherein the digital image is pyramidally decomposed and distorted, the distortions being selected from the group consisting of additive noise, image compression, halftoning, and image scaling.

8. A watermark image produced by the method according to claim 2.

* * * * *